United States Patent
Lee et al.

(10) Patent No.: US 10,658,676 B2
(45) Date of Patent: May 19, 2020

(54) OXYGEN REDUCTION CATALYST

(71) Applicants: SHOWA DENKO K.K., Tokyo (JP); NATIONAL UNIVERSITY CORPORATION YOKOHAMA NATIONAL UNIVERSITY, Yokohama-shi, Kanagawa (JP)

(72) Inventors: Kunchan Lee, Tokyo (JP); Yoshinori Yamato, Tokyo (JP); Kenichiro Ota, Yokohama (JP); Akimitsu Ishihara, Yokohama (JP)

(73) Assignees: SHOWA DENKO K.K., Tokyo (JP); NATIONAL UNIVERSITY CORPORATION YOKOHAMA NATIONAL UNIVERSITY, Yokohama-shi, Kanagawa (JP)

( * ) Notice: Subject to any disclaimer, the term of this patent is extended or adjusted under 35 U.S.C. 154(b) by 0 days.

(21) Appl. No.: 16/471,397

(22) PCT Filed: Dec. 22, 2017

(86) PCT No.: PCT/JP2017/046109
§ 371 (c)(1),
(2) Date: Jun. 19, 2019

(87) PCT Pub. No.: WO2018/117255
PCT Pub. Date: Jun. 28, 2018

(65) Prior Publication Data
US 2019/0386319 A1 Dec. 19, 2019

(30) Foreign Application Priority Data
Dec. 22, 2016 (JP) .................................. 2016-249353

(51) Int. Cl.
*H01M 4/00* (2006.01)
*H01M 4/90* (2006.01)
(Continued)

(52) U.S. Cl.
CPC ........... *H01M 4/9016* (2013.01); *B01J 27/24* (2013.01); *H01M 4/366* (2013.01); *H01M 4/48* (2013.01); *H01M 8/10* (2013.01)

(58) Field of Classification Search
CPC ...... B01J 21/063; B01J 27/24; C01P 2002/70; C01P 2002/74; C01P 2002/85; H01M 4/00; H01M 4/366; H01M 4/48; H01M 8/10
(Continued)

(56) References Cited

U.S. PATENT DOCUMENTS 5,514,908 A * 5/1996 Liao .................. H01L 21/28518
257/751
2006/0251563 A1 * 11/2006 Gole ........................ B01J 23/74
423/385
(Continued)

FOREIGN PATENT DOCUMENTS

JP 2004-97868 A 4/2004
JP 2006052397 A * 2/2006 ............. C01G 23/00
(Continued)

OTHER PUBLICATIONS

M. Radecka et al., "Chemical composition, crystallographic structure and impedance spectroscopy of titanium oxynitride TiNxOy thin films." Solid State Ionics 192, pp. 693-698. (Year: 2011).*
(Continued)

*Primary Examiner* — Patricia L. Hailey
(74) *Attorney, Agent, or Firm* — Sughrue Mion, PLLC (57) ABSTRACT

An object of the invention is to provide an oxygen reduction catalyst composed of a titanium oxynitride having high oxygen reduction capacity. The oxygen reduction catalyst of the invention is a titanium oxynitride that has a nitrogen element content of 8.0 to 15 mass %, has a crystal structure of anatase titanium dioxide in a powder X-ray diffraction
(Continued)

measurement, and has a signal intensity ratio N—Ti—N/O—Ti—N in an X-ray photoelectron spectroscopic analysis of in the range of 0.35 to 0.70.

6 Claims, 9 Drawing Sheets

(51) Int. Cl.
*B01J 27/24* (2006.01)
*H01M 4/36* (2006.01)
*H01M 4/48* (2010.01)
*H01M 8/10* (2016.01)

(58) Field of Classification Search
USPC .................................. 502/200, 350; 429/400
See application file for complete search history.

(56) References Cited

U.S. PATENT DOCUMENTS

| 2013/0143119 | A1 | 6/2013 | Mah et al. |
| 2015/0298973 | A1* | 10/2015 | Lim ..................... C01G 23/00 502/200 |
| 2017/0098830 | A1 | 4/2017 | Ota et al. |

FOREIGN PATENT DOCUMENTS

| JP | 2011-42535 A | 3/2011 |
| JP | 2011-194328 A | 10/2011 |
| JP | 5055557 B2 | 8/2012 |
| WO | 2015/146490 A1 | 10/2015 |
| WO | 2018/117254 | * 6/2018 ............. B01J 27/24 |

OTHER PUBLICATIONS

C. Gebauer et al., "Performance of titanium oxynitrides in the electrocatalytic oxygen evolution reaction." Nano Energy 29, pp. 136-148. (Year: 2016).*
Ren, Yaqi, et al, Solvothermal synthesis of dendritic $TiN_xO_y$ nanostructure for oxygen reduction reaction electrocatalysis, RSC Advances, Royal Society of Chemistry [online], 2015, [retrieved on Jan. 30, 2018]; 15 pages.
Anandan, Sambandam, et al., Catalytic degradation of a plasticizer, di-ethylhexy 1 phthalate, using $N_x$-$TiO_{2-X}$ nanoparticles synthesized via co-precipitation, Chemical Engineering Journal, 2013, vol. 231, pp. 182-189.
Selvam, K., et al., "Mesoporous nitrogen doped nano titania—A green photocatalyst for the effective reductive cleavage of azoxybenzenes to amines or 2-phenylindazoles in methanol", Applied Catalysis A: General, 2012, No. 413-414, pp. 213-222.
Chisaka Mitsuharu et al., "Oxygen reduction reaction activity of ntrogen-doped titanium oxide in acid media", Electrochimica Acta 88 (2013), pp. 697-707.
Translation of International Search Report for PCT/JP2017/046109 dated Feb. 13, 2018.
Translation of Written Opinion of International Searching Authority for PCT/JP2017/046109 dated Feb. 13, 2018.
Decision to Grant a Patent dated Jul. 17, 2018 by the Japan Patent Office in corresponding JPA No. 2018-523825.

* cited by examiner

OXYGEN REDUCTION CATALYST

This Application is a National Stage of International Application No. PCT/JP2017/046109 filed Dec. 22, 2017, claiming priority based on Japanese Patent Application No. 2016-249353 filed Dec. 22, 2016.

TECHNICAL FIELD

The present invention relates to an oxygen reduction catalyst composed of a titanium oxynitride.

BACKGROUND ART

A titanium oxide is used as a photocatalyst or a catalyst involved in an oxidation-reduction reaction. Especially, it is known that it can also be used as an electrode catalyst of a fuel cell by utilizing the oxygen reduction catalytic capacity of a titanium oxide catalyst.

In Patent Document 1, it has been reported that by heat-treating a metal carbonitride or a metal nitride in the presence of oxygen and hydrogen to create an oxygen defect in which oxygen is replaced with another element, an active site and electroconductivity can be secured, and therefore a titanium oxide catalyst having high oxygen reduction catalytic capacity can be produced.

In Patent Document 2, it has been reported that an oxide catalyst with high oxygen reduction catalytic capacity can be produced by sputtering a metal oxide such as $TiO_2$ to prepare an oxygen reduction electrode having an oxygen defect for a direct fuel cell.

In Non Patent Document 1, it has been reported that a titanium oxide catalyst having high oxygen reduction catalytic capacity can be produced by treating a titanium oxycarbonitride in an atmosphere of a hydrogen, oxygen, and nitrogen, and thereafter treating it with an ammonia gas. Further, a powder has been prepared by heat-treating a titanium oxide having an anatase titanium dioxide structure in an ammonia gas atmosphere, and used as a reference in a comparison of oxygen reduction catalytic capacity.

The method of Patent Document 1 obtains an active site by replacing oxygen with another element, and is characterized that the crystal lattice is expanded when an oxygen defect is created. Therefore, the catalyst according to Patent Document 1 is unstable in the strongly acidic condition during a fuel cell operation, and is likely to be eluted, which is not preferable in terms of durability.

The method of Patent Document 2 prepares a catalyst in which oxygen atoms inside the metal oxide are decreased without replacement with another element, and does not prepare a catalyst with an oxygen defect generated by replacement with nitrogen. Meanwhile, since it is prepared as a thin film by sputtering, it is difficult to obtain a necessary amount for a catalyst having a large specific surface area such as a powder, which is not preferable.

Although by the preparation method of titanium oxycarbonitride according to Non Patent Document 1 an active site is obtained by replacing oxygen with another element, a strain tends to be generated in the crystal lattice, because carbon is contained in the catalyst in addition to titanium, oxygen, and nitrogen to increase the kinds of elements having different atomic radii. Therefore, the catalyst according to Non Patent Document 1 is unstable in the strongly acidic condition during a fuel cell operation, and is likely to be eluted, which is not preferable in terms of durability. Further, with respect to the ammonia-treated anatase titanium oxide for a reference, since a preparation method is general, the signal intensity ratio N—Ti—N/O—Ti—N in an X-ray photoelectron spectroscopic analysis exceeds 0.70, indicating a high titanium nitride content. As a result, the catalytic activity is lowered, and the spontaneous potential is also about 0.4V.

CITATION LIST

Patent Documents

Patent Document 1: JP 2011-194328 A
Patent Document 2: Japanese Patent No. 5055557

Non Patent Document

Non Patent Document 1: Electrochimica Acta, 2013, 88, 697-707

SUMMARY OF INVENTION

Technical Problem

The present invention aims to solve such problems in the conventional technologies.

That is, an object of the present invention is to provide an oxygen reduction catalyst composed of a titanium oxynitride having high oxygen reduction capacity.

Solution to Problem

The present invention relates to the following [1] to [6].
[1] An oxygen reduction catalyst being a titanium oxynitride that has a nitrogen element content of 8.0 to 15 mass %, has a crystal structure of anatase titanium dioxide in a powder X-ray diffraction measurement, and has a signal intensity ratio of N—Ti—N/O—Ti—N in an X-ray photoelectron spectroscopic analysis of in the range of 0.35 to 0.70.
[2] The oxygen reduction catalyst according to [1] above, wherein each of |a1−a0|, |b1−b0|, and |c1−c0| is 0.005 A or less, when a1, b1, and c1 represent lattice constants a, b, and c, respectively, of the crystal structure of the titanium oxynitride, and a0, b0, and c0 represent lattice constants a, b, and c, respectively, of the crystal structure of anatase titanium dioxide consisting solely of titanium and oxygen.
[3] An electrode catalyst for a fuel cell, composed of the oxygen reduction catalyst according to [1] or [2] above.
[4] A fuel cell electrode comprising a catalyst layer comprising the electrode catalyst for a fuel cell according to [3] above.
[5] A membrane electrode assembly comprising a cathode, an anode, and a polymer electrolyte membrane placed between the cathode and the anode, wherein at least either of the cathode and the anode is the fuel cell electrode according to [4] above.
[6] A fuel cell comprising the membrane electrode assembly according to [5] above.

Advantageous Effects of Invention

By using the oxygen reduction catalyst of the present invention as an electrode catalyst for a fuel cell, it becomes possible to obtain a fuel cell having high oxygen reduction capacity.

DESCRIPTION OF EMBODIMENTS

[Oxygen Reduction Catalyst]

An oxygen reduction catalyst of the present invention is a titanium oxynitride that has a nitrogen element content of 8.0 to 15 mass %, has a crystal structure of anatase titanium dioxide in a powder X-ray diffraction measurement, and has a signal intensity ratio N—Ti—N/O—Ti—N in an X-ray photoelectron spectroscopic analysis of in the range of 0.35 to 0.70. In other words, the oxygen reduction catalyst of the present invention may be an oxygen reduction catalyst composed of a specific titanium oxynitride. However, this does not strictly exclude the presence of impurities in the oxygen reduction catalyst of the present invention, and inevitable impurities originated from raw materials and/or production process, or other impurities to the extent the characteristics of the catalyst be not impaired may be included in the oxygen reduction catalyst of the present invention.

"Titanium oxynitride" as used herein means collectively substances that contain, as a whole, only titanium, nitrogen and oxygen as constituent elements, and are composed of one or two or more compound species. In this regard, "oxygen reduction catalyst containing titanium oxide" is herein occasionally referred to as "titanium oxide catalyst".

Possible crystal structures of the titanium oxynitride composing the oxygen reduction catalyst of the present invention include a crystal structure of rutile titanium dioxide, a crystal structure of anatase titanium dioxide, and a crystal structure of brookite titanium dioxide. These crystal structures may be identified by the presence of peaks or appearance patterns peculiar to the respective crystal structures in an X-ray diffraction spectrum obtained from a powder X-ray diffraction measurement.

In the crystal structure of rutile titanium dioxide, a pattern tends to appear in which a large peak appears at a position of $2\theta=27°$ to $28°$, but a peak does not appear at a position of $2\theta=30°$ to $31°$.

On the other hand, in the crystal structure of anatase titanium dioxide, a large peak tends to appear at a position of $2\theta=25°$ to $26°$.

Further, in the crystal structure of brookite titanium dioxide, a large peak tends to appear at a position of $2\theta=25°$ to $26°$, and another peak also tends to appear at a position of $2\theta=30°$ to $31°$. Therefore, the crystal structure of brookite titanium dioxide can be discriminated from the crystal structure of anatase titanium dioxide by the presence or absence of a peak at a position of $2\theta=30°$ to $31°$.

Meanwhile, in the case of a titanium oxynitride having a high nitrogen element content, a cubic crystal structure based on titanium nitride may be sometimes included. In this case, peaks tend to appear at a position of $2\theta=37°$ to $38°$ and a position of $2\theta=43°$ to $44°$.

Having the crystal structure of anatase titanium dioxide as used herein means that when the total amount of titanium compound crystals confirmed in an X-ray diffraction measurement is taken as 100 mol %, the content of anatase titanium dioxide (hereinafter occasionally referred to as "anatase content ratio") is confirmed to be 50 mol % or more, and the total content of rutile and brookite titanium dioxide is confirmed to be less than 5 mol %. The rest is cubic titanium nitride. As shown in Examples hereof, in a typical embodiment of the present invention, the oxygen reduction catalyst of the present invention contains a small amount of cubic titanium nitride. From this, in the oxygen reduction catalyst of the present invention, the anatase content ratio tends to be less than 100 mol %, for example, 80 mol % or less in many cases. The anatase content ratio is a value measured by XRD as described later.

For securing acid resistance during a fuel cell operation, the crystal structure of the above anatase titanium dioxide preferably has lattice constants less changed from those of anatase titanium dioxide composed solely of titanium and oxygen (namely anatase titanium dioxide not containing nitrogen) and retains the crystal lattice of a titanium dioxide that is thermodynamically stable. Specifically, when a1, b1 and c1 represent the lattice constants a, b and c, respectively, of the titanium oxynitride, and a0, b0, and c0 represent the lattice constants a, b and c, respectively, of the anatase titanium dioxide consisting solely of titanium and oxygen (which may be referred to herein also as the "standard anatase titanium dioxide"), each of |a1−a0|, |b1−b0|, and |c1−c0| is preferably 0.005 Å (0.0005 nm) or less.

The lattice constants a, b, and c can be determined by a Rietveld analysis of a powder X-ray diffraction spectrum.

The nitrogen element content is in the range of 8.0 to 15 mass %, preferably 9.0 to 13 mass %, and more preferably 9.0 to 11 mass %. When the nitrogen element content is less than the above lower limit value, especially less than 8.0 mass %, the titanium oxide is in an insufficiently nitrided state, and formation of catalytic active sites tends to be insufficient. A state in which the nitrogen element content is higher than the above upper limit value, especially higher than 15 mass %, is a state in which titanium nitride unstable under an acidic condition is contained at a higher content, and the function as a catalyst tends to be lost rapidly during a fuel cell operation.

With respect to a titanium oxynitride composing the oxygen reduction catalyst of the present invention, the signal intensity ratio N—Ti—N/O—Ti—N in the X-ray photoelectron spectroscopic analysis is preferably in the range of 0.35 to 0.70, and preferably 0.36 to 0.64. When the signal intensity ratio N—Ti—N/O—Ti—N is smaller than the above lower limit value, the titanium oxide is in an insufficiently nitrided state, and formation of catalytic active sites tends to be insufficient. On the other hand, a titanium oxynitride, in which the signal intensity ratio N—Ti—N/O—Ti—N is larger than the above upper limit value, contains a large amount of titanium nitride as a constituent compound species. Since titanium nitride is unstable under acidic conditions, when a titanium oxynitride containing a large amount of titanium nitride as a constituent compound species is used as an oxygen reduction catalyst, its function as a catalyst tends to be lost rapidly during a fuel cell operation.

The signal intensity ratio N—Ti—N/O—Ti—N can be specifically obtained in the following way: an X-ray photoelectron spectroscopic analysis is conducted to give a Ti2p XPS spectrum, wherein the bond energy is corrected based on the peak position attributable to a hydrocarbon chain of the C1s XPS spectrum as 284.6 eV; the intensity value of the Ti2p XPS spectrum at 455.5 eV is adopted as the intensity of N—Ti—N, and the intensity value at 458.3 eV is adopted as the intensity of O—Ti—N; and the signal intensity ratio N—Ti—N/O—Ti—N can be obtained as a signal intensity ratio of the intensity values.

[Method for Producing Oxygen Reduction Catalyst]

The oxygen reduction catalyst of the present invention may be obtained by using titanium oxide as a raw material, raising its temperature at 40 to 80° C./min in an ammonia gas stream, and calcining it at 500 to 1000° C.

Detailed conditions are described below.

(Raw Material: Titanium Oxide)

The titanium oxide used as a raw material in the production method of the present invention is preferably at least one selected from the group consisting of an anatase titanium dioxide, a reduced titanium oxide, such as $Ti_3O_4$, $Ti_4O_7$, and $Ti_3O_5$, and a hydroxylated titanium, such as TiO(OH), and especially preferably anatase titanium dioxide. Anatase titanium dioxide begins to undergo phase transition to rutile titanium dioxide at 800° C. or higher. Therefore, it is more preferable to use a titanium oxide having a small particle size so as to increase the reactivity with nitrogen, for the sake of enabling replacement with a nitrogen atom at a lower temperature, and maintaining the skeleton of anatase titanium dioxide. On the other hand, the reduced titanium oxide such as $Ti_3O_4$ and the hydroxylated titanium, such as TiO(OH), can be converted to anatase titanium dioxide by a heat treatment at a low temperature of about 700° C. or less.

These titanium oxides may be used singly or in combinations of two or more thereof.

(Calcination Conditions)

According to the present invention, the heat treatment of the titanium oxide is carried out in a temperature increase step of raising the temperature of the titanium oxide to the target heat treatment temperature, and a calcination step of keeping the temperature as it is after arriving at the target heat treatment temperature to perform calcination of the titanium oxide. The temperature increase step and the calcination step are carried out in an ammonia gas stream.

In this regard, the ammonia gas stream used when the temperature increase step and the calcination step are carried out may be a stream composed solely of an ammonia gas, or may be a mixed stream of an ammonia gas and an inert gas. When a mixed stream of an ammonia gas and an inert gas is employed as the ammonia gas stream, the ammonia concentration in the mixed stream is 10 vol % to 100 vol %. More specifically, at a heat treatment temperature of 600 to 700° C. described later, it is preferably in the range of 60 vol % to 100 vol %, more preferably in the range of 70 vol % to 100 vol %. At a heat treatment temperature of 700 to 800° C., it is preferably in the range of 10 vol % to 70 vol %, more preferably in the range of 10 vol to 60 vol %, and further preferably in the range of 10 vol % to 40 vol %. The above ranges of the ammonia concentration and the heat treatment temperature are preferable because when calcination is performed in the above ranges, both the electrode potential at 10 μA, and the spontaneous potential in an oxygen gas atmosphere, which are indices of oxygen reduction catalyst activity, can be favorable. The aforedescribed conditions do not apply to an oxygen reduction catalyst to be obtained in Comparative Example 7 which is prepared using brookite titanium dioxide described later.

The temperature increase rate in raising the temperature is in the range of 40 to 80° C./min, and preferably 50 to 60° C./min. When the temperature increase rate is higher than the above range, there is a risk that the temperature may overshoot a target heat treatment temperature during temperature increase; and in such a case sintering or particle growth between particles of a resultant oxygen reduction catalyst may occur, to induce transition to a crystal phase other than anatase titanium dioxide or decrease in the specific surface area of the catalyst, leading occasionally to insufficient catalyst performance. On the contrary, when the temperature increase rate is lower than the above range, generation of a titanium nitride may occur preferentially over a nitrogen replacement of a titanium oxide, and it may become difficult to obtain an oxygen reduction catalyst having high catalytic activity.

The heat treatment temperature for performing the aforedescribed calcination (hereinafter "calcination temperature") is 600 to 800° C. When the calcination temperature is higher than the above temperature range, sintering or particle growth between particles of a resultant oxygen reduction catalyst may occur, to induce transition to a crystal phase other than anatase titanium dioxide or decrease in the specific surface area of the catalyst, leading occasionally to insufficient catalyst performance. On the contrary, when the calcination temperature is lower than the above temperature range, the progress of the nitridation reaction of a titanium oxide is retarded or does not occur, and it tends to become difficult to obtain an oxygen reduction catalyst having high catalytic activity. As mentioned above, the combination with the ammonia concentration in a mixed stream also needs to be taken into consideration. Meanwhile, the time duration for calcination is usually from 1 to 5 hours, and preferably from 2 to 4 hours. When the calcination time is longer than the time duration upper limit, sintering or particle growth between particles of a resultant oxygen reduction catalyst may occur, to cause decrease in the specific surface area of the catalyst, leading occasionally to insufficient catalyst performance. On the contrary, when the calcination time is shorter than the above time duration lower limit, the progress of the nitridation reaction of a titanium oxide becomes insufficient, and it tends to become difficult to obtain an oxygen reduction catalyst having high catalytic activity.

[Electrode, Membrane Electrode Assembly, and Fuel Cell]

Although there is no particular restriction on the use of the aforedescribed oxygen reduction catalyst of the present invention, it may be used favorably as an electrode catalyst for a fuel cell, an electrode catalyst for an air cell, etc.

(Fuel Cell Electrode)

One of the preferred embodiments of the present invention is a fuel cell electrode having a catalyst layer containing the aforedescribed oxygen reduction catalyst of the present invention. In this embodiment, the fuel cell electrode includes an electrode catalyst for a fuel cell composed of the oxygen reduction catalyst of the present invention.

The catalyst layers constituting a fuel cell electrode include an anode catalyst layer and a cathode catalyst layer, and the oxygen reduction catalyst of the present invention may be used for both of them. Since the oxygen reduction catalyst of the present invention has a high oxygen reduction capacity, it is preferably used as the cathode catalyst layer.

In this regard, the catalyst layer preferably further comprises a polymer electrolyte. There is no particular restriction on the polymer electrolyte insofar as it is generally used in a fuel cell catalyst layer. Specific examples thereof include a perfluorocarbon polymer having a sulfo group (for example, NAFION®), a hydrocarbon-based polymer compound having a sulfo group, a polymer compound doped with an inorganic acid such as phosphoric acid, an organic/inorganic hybrid polymer partially substituted with a proton-conducting functional group, and a proton conductor obtained by impregnating a polymer matrix with a phosphoric acid solution or a sulfuric acid solution. Among these, NAFION® is preferable. Examples of a supply source of NAFION® in forming the catalyst layer include a 5% solution of NAFION® (DE 521, E. I. du Pont de Nemours and Company).

If necessary, the catalyst layer may further contain electron-conductive particles composed of carbon, an electroconductive polymer, an electroconductive ceramic, a metal, or an electroconductive inorganic oxide such as tungsten oxide or iridium oxide, etc.

There is no particular restriction on the method for forming the catalyst layer, and a publicly known method may be appropriately employed.

On the other hand, the fuel cell electrode may further have a porous support layer in addition to the catalyst layer.

The porous support layer is a layer that diffuses a gas (hereinafter also referred to as a "gas diffusion layer"). Although the gas diffusion layer may be any material insofar as it has electron conductivity, high gas diffusivity, and high corrosion resistance, a carbon-based porous material, such as carbon paper, and carbon cloth, is generally used.

(Membrane Electrode Assembly)

A membrane electrode assembly of the present invention is a membrane electrode assembly having a cathode, an anode, and a polymer electrolyte membrane placed between the cathode and the anode, and at least either of the cathode and the anode is the aforedescribed fuel cell electrode of the present invention. In this case, for the electrode in which the fuel cell electrode of the present invention is not employed, a conventionally known fuel cell electrode, such as a fuel cell electrode containing a platinum-based catalyst such as platinum on carbon may be used. Examples of a preferred embodiment of the membrane electrode assembly of the present invention include one in which at least the cathode is the fuel cell electrode of the present invention.

In a case where the fuel cell electrode of the present invention has a gas diffusion layer, this gas diffusion layer is placed on the side opposite to the catalyst layer as viewed from the polymer electrolyte membrane in the membrane electrode assembly of the present invention.

As the polymer electrolyte membrane, for example, an electrolyte membrane using a perfluorosulfonic acid, or a hydrocarbon-based electrolyte membrane is generally used. Also a membrane in which a polymer microporous membrane is impregnated with a liquid electrolyte, or a membrane in which a porous material is filled with a polymer electrolyte may be used.

The membrane electrode assembly of the present invention can be appropriately formed using a conventionally known method.

(Fuel Cell)

A fuel cell of the present invention comprises the aforedescribed membrane electrode assembly. In this regard, in a typical embodiment of the present invention, the fuel cell of the present invention further comprises two current collectors in a mode that the two current collectors sandwich the membrane electrode assembly. The current collector may be one which is conventionally known one and which is generally employed for a fuel cell.

EXAMPLES

Example 1

(1) Preparation of Oxygen Reduction Catalyst

An oxygen reduction catalyst (1) was obtained by weighing 0.2 g of an anatase titanium dioxide powder (SUPER-TITANIA® grade F-6, manufactured by Showa Denko K.K); raising its temperature using a quartz tube furnace in a stream of an ammonia gas (gas flow rate of 200 mL/min) (ammonia gas: 100 vol %) from room temperature to 600° C. at a temperature increase rate of 50° C./min; and performing calcination at 600° C. for 3 hours.

(2) Electrochemical Measurement (Preparation of Catalyst Electrode)

The fuel cell electrode (hereinafter, "catalyst electrode") comprising an oxygen reduction catalyst was prepared as follows. A liquid containing 15 mg of the obtained oxygen reduction catalyst (1), 1.0 mL of 2-propanol, 1.0 mL of ion exchanged water, 62 μL of NAFION® (5% aqueous solution of NAFION, manufactured by Wako Pure Chemical Industries, Ltd.) was stirred by irradiation with ultrasonic waves, and mixed to a suspension. The mixture of 20 μL was applied to a glassy carbon electrode (diameter: 5.2 mm, manufactured by Tokai Carbon Co., Ltd.), dried at 70° C. for 1 hour, to give a catalyst electrode for measuring the oxygen reduction catalyst activity.

(Measurement of Oxygen Reduction Catalyst Activity)

An electrochemical evaluation of the oxygen reduction active catalytic capacity of the oxygen reduction catalyst (1) was performed as follows. The catalyst electrode prepared in the above "preparation of catalyst electrode" was polarized at a potential scanning rate of 5 mV/sec in a 0.5 mol/dm$^3$ aqueous solution of sulfuric acid at 30° C. and the current-potential curve was measured in each of an oxygen gas atmosphere and a nitrogen gas atmosphere. Also, a spontaneous potential (open circuit potential) in a non-polarized state in an oxygen gas atmosphere was obtained. In doing so, a reversible hydrogen electrode in an aqueous solution of sulfuric acid with the same concentration was used as a reference electrode.

From the difference between the reduction current curve in the oxygen gas atmosphere and the reduction current curve in the nitrogen gas atmosphere among the current-potential curves obtained in the above electrochemical evaluation, an electrode potential at 10 μA (hereinafter also referred to as electrode potential) was obtained. These electrode potentials and spontaneous potentials are shown in Table 1. The spontaneous potential represents the quality of the oxygen reduction catalyst activity, and the electrode potential at 10 μA represents the quantity of the oxygen reduction catalyst activity.

(3) Powder X-Ray Diffraction Measurement (Anatase Titanium Dioxide Crystal and Anatase Content Ratio)

Figure 1:
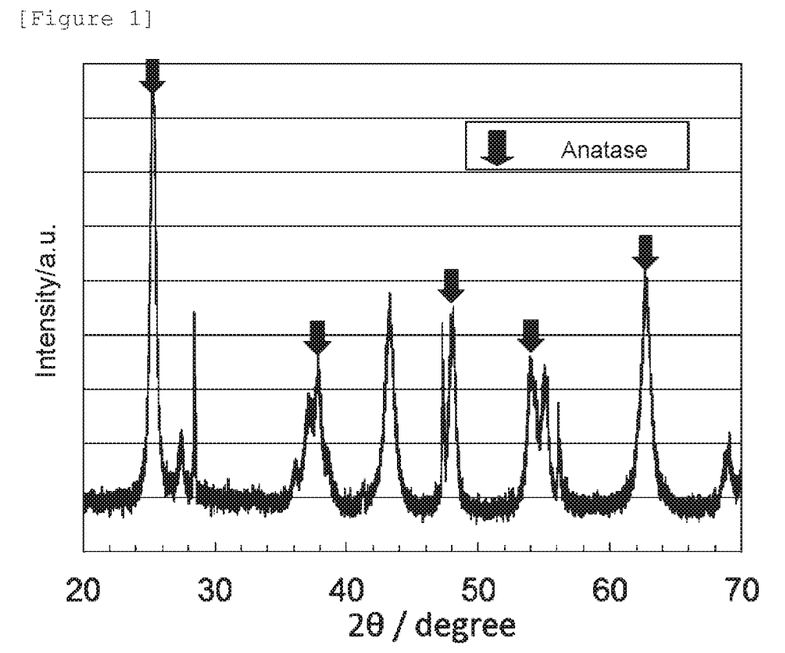
FIG. 1 shows an X-ray diffraction spectrum of the oxygen reduction catalyst (1) of Example 1.

A powder X-ray diffraction measurement of a sample was performed using a powder X-ray diffractometer PANalytical MPD (manufactured by Spectris plc). As for the measurement conditions, a measurement was performed in the range of the diffraction angle of 2θ=10 to 900 using a Cu-Kα ray (output 45 kV, 40 mA), to give an X-ray diffraction spectrum of the oxygen reduction catalyst (1). The X-ray diffraction spectrum obtained by performing the powder X-ray diffraction measurement is shown in FIG. 1. In this regard, "a.u." in FIG. 1 stands for arbitrary unit, and the same applies to FIGS. 2 to 18.

The height of the peak with the strongest diffraction intensity among the peaks attributable to anatase titanium dioxide crystal (Ha), the height of the peak with the strongest diffraction intensity among the peaks attributable to a rutile titanium dioxide crystal (Hr), the height of the peak with the strongest diffraction intensity among the peaks attributable to a brookite titanium dioxide crystal (Hb), and the height of the peak with the strongest diffraction intensity among the peaks attributable to a cubic titanium nitride (Hc) were determined and the content of the anatase titanium dioxide (anatase content ratio) in the oxygen reduction catalyst (1) was determined according to the following expression. In this regard, the respective heights of the peaks with the strongest diffraction intensity were obtained after subtracting an arithmetic mean of the signal intensity in the range of 50 to 520 where a diffraction peak was not detected as the baseline.

Anatase content ratio (mol %)=[Ha/(Ha+Hr+Hb+Hc]×100

It was confirmed that the oxygen reduction catalyst (1) has an anatase content ratio of 70 mol %, wherein the rest is a cubic titanium nitride, and has the crystal structure of anatase titanium dioxide.

(4) Rietveld Analysis

The lattice constants of the obtained oxygen reduction catalyst (1) were determined by a Rietveld analysis of the powder X-ray diffraction spectrum. The lattice constants of the anatase titanium dioxide were obtained by the Rietveld analysis in which a Pseudo-Voigt function and reference code 98-015-4604 as the standard anatase titanium dioxide were used in the HighScore+ Ver. 3.0d, the analysis software attached to PANalytical MPD, and a search-match of the X-ray diffraction pattern was performed so as to refine the parameters related to the crystal structure. The lattice constants a, b, and c of the anatase titanium dioxide of the oxygen reduction catalyst (1) determined by the Rietveld analysis are shown in Table 1.

The lattice constants a, b, and c of the standard anatase titanium dioxide are 3.786 Å, 3.786 Å, and 9.495 Å, respectively. All the differences of the lattice constants a, b, and c of the oxygen reduction catalyst (1) from those of the standard anatase titanium dioxide were 0.005 Å or less.

(5) X-Ray Photoelectron Spectroscopic Analysis

Figure 2:
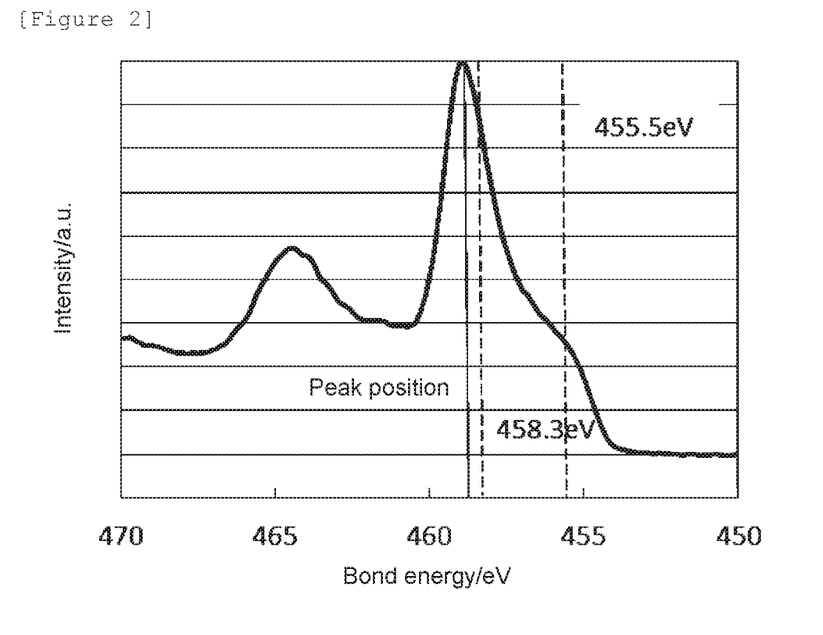
FIG. 2 shows a Ti2p XPS spectrum of the oxygen reduction catalyst (1) of Example 1.

An X-ray photoelectron spectroscopic analysis of the oxygen reduction catalyst (1) was performed using an X-ray photoelectron spectrometer Quantera II (manufactured by ULVAC-PHI, Inc.). The sample was embedded in metal indium for immobilization. A measurement was performed under the conditions of X-ray: Al monochromatic, 25 W, 15 kV, measurement area: 400×400 μm², electron/ion neutralization gun: ON, and photoelectron take-off angle: 45°; and correction of the bond energy was performed with respect to the position of the peak derived from a contaminated hydrocarbon chain in the C1s XPS spectrum defined as 284.6 eV. The obtained Ti2p XPS spectrum is shown in FIG. 2. The signal intensity at 455.5 eV reflects the bonding state of N—Ti—N, which means formation of a titanium nitride, and a state of low oxygen reduction capacity. The signal intensity at 458.3 eV reflects the bonding state of O—Ti—N for which O in O—Ti—O has been replaced with N, namely it represents a state of high oxygen reduction capacity where part of oxygen atoms in titanium dioxide has been replaced with nitrogen atoms. The signal intensity ratio N—Ti—N/O—Ti—N is shown in Table 1 which ratio was determined using the signal intensity value of the Ti2p XPS spectrum at 455.5 eV as the intensity of N—Ti—N, and the signal intensity value at 458.3 eV as the intensity of O—Ti—N, after subtracting an arithmetic mean of the signal intensity in the range of 450 to 452 eV where a signal derived from Ti2p was not observed as the baseline, and the peak position determined as a bond energy at which the highest intensity was obtained in 458.0 to 459.5 eV is shown in Table 1 together with the signal intensity ratio N—Ti—N/O—Ti—N.

In a case in which the peak position in terms of bond energy of a peak located in the range of 458.0 to 459.5 eV is shifted toward the lower energy side compared to a bond energy of 459.0 eV attributable to O—Ti—O in anatase titanium dioxide not having an oxygen defect, it can be determined that an oxygen atom in the titanium dioxide has been replaced with a nitrogen atom to have an oxygen defect. Since the oxygen reduction catalyst (1) has the crystal structure of anatase titanium dioxide, its peak position is shifted to a lower energy side compared to the bond energy, 459.0 eV, of O—Ti—O in anatase titanium dioxide not having an oxygen defect, and the nitrogen element content is 15 mass % or less, it can be determined that it has an oxygen defect formed by replacement of an oxygen atom in anatase titanium dioxide with a nitrogen atom.

(6) Elemental Analysis

A measurement was performed after weighing about 10 mg of the oxygen reduction catalyst (1) into a nickel capsule, by an inert gas fusion-thermal conductivity method using a TC-600 manufactured by LECO Corporation with an output of 1500 W to 5000 W (70 Wup/sec). The nitrogen element content (mass %) thus obtained is shown in Table 1.

Example 2

(1) Preparation of Oxygen Reduction Catalyst

The oxygen reduction catalyst (2) was obtained by performing temperature increase and calcination in the same manner as in Example 1 except that the stream of an ammonia gas was changed to a mixed stream of an ammonia gas and a nitrogen gas, the flow rates of the ammonia gas and the nitrogen gas were changed to 20 mL/min and 180 mL/min (ammonia gas: 10 vol %), respectively, and the end-point temperature at the temperature increase and the temperature for performing calcination were changed to 800° C.

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (2) were performed in the same manner as in Example 1.

Figure 3:
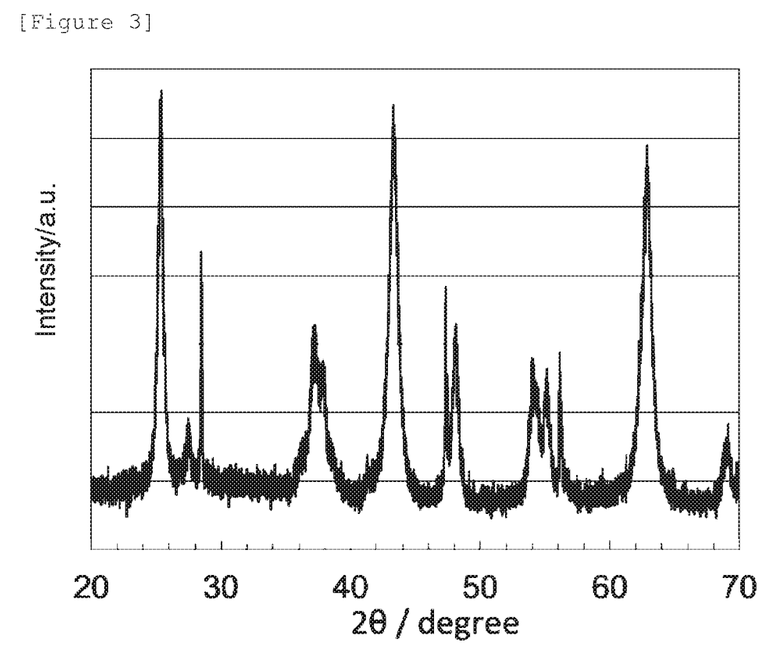
FIG. 3 shows an X-ray diffraction spectrum of the oxygen reduction catalyst (2) of Example 2.
Figure 4:
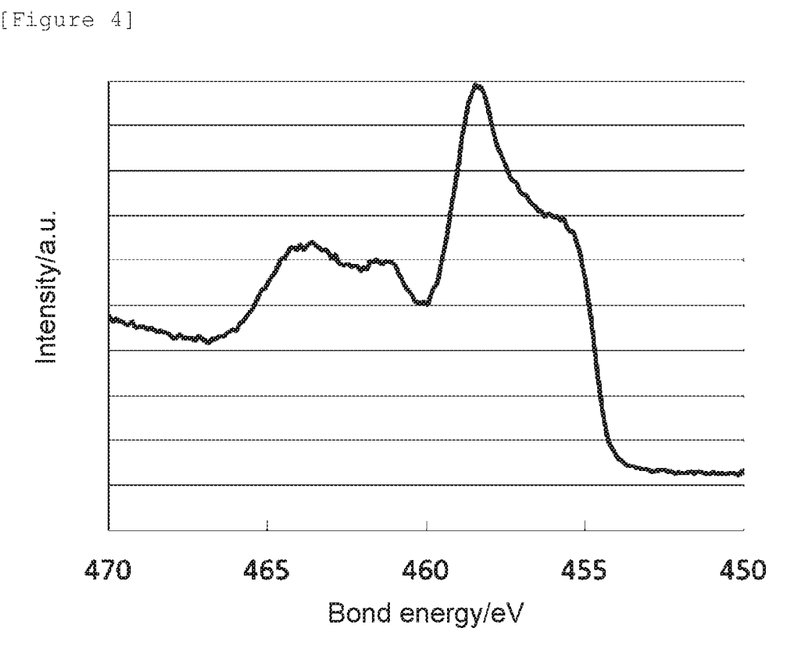
FIG. 4 shows a Ti2p XPS spectrum of the oxygen reduction catalyst (2) of Example 2.

The obtained X-ray diffraction spectrum and Ti2p XPS spectrum are shown in FIG. 3 and FIG. 4, respectively.

Also, the lattice constants a, b, and c of the oxygen reduction catalyst (2) determined by a Rietveld analysis, the nitrogen element content (mass %) obtained by an elemental analysis, the signal intensity ratio N—Ti—N/O—Ti—N determined by an X-ray photoelectron spectroscopic analysis, the peak position determined as a bond energy at which the highest intensity was obtained in 458.0 to 459.5 eV, and the electrode potential and the spontaneous potential determined by an electrochemical measurement are shown in Table 1.

All the differences of the lattice constants a, b, and c of the oxygen reduction catalyst (2) from those of the standard anatase titanium dioxide were 0.005 Å or less.

It has been confirmed that the oxygen reduction catalyst (2) has an anatase content ratio of 50 mol %, wherein the rest is a cubic titanium nitride, and has the crystal structure of anatase titanium dioxide. Further, since its peak position is shifted to a lower energy side compared to the bond energy, 459.0 eV, of titanium in anatase titanium dioxide not having an oxygen defect (namely, bond energy of O—Ti—O), and the nitrogen element content is 15 mass % or less, it can be determined that it has an oxygen defect formed by replacement of an oxygen atom in anatase titanium dioxide with a nitrogen atom.

Comparative Example 1

(1) Preparation of Oxygen Reduction Catalyst

The oxygen reduction catalyst (c1) was obtained by performing temperature increase and calcination in the same manner as in Example 1 except that the stream of an ammonia gas was changed to a mixed stream of an ammonia gas and a nitrogen gas, the flow rates of the ammonia gas and the nitrogen gas were both changed to 100 mL/min (ammonia gas: 50 vol %), and the end-point temperature at the temperature increase and the temperature for performing calcination were changed to 500° C.

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c1) were performed in the same manner as in Example 1.

Figure 5:
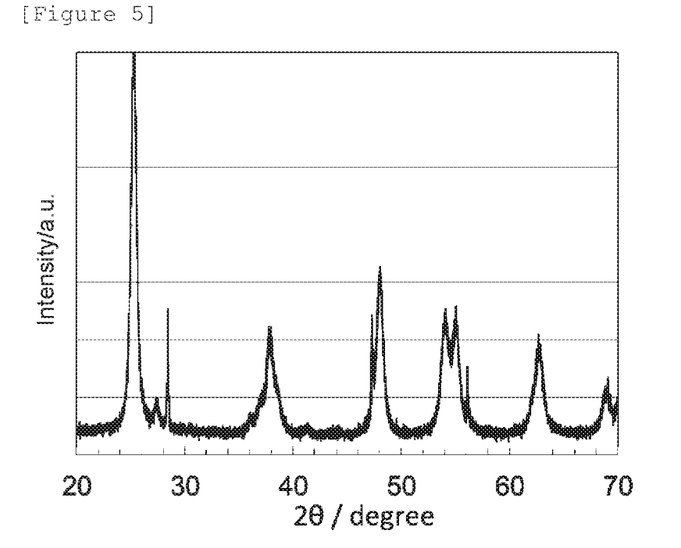
FIG. 5 shows an X-ray diffraction spectrum of the oxygen reduction catalyst (c1) of Comparative Example 1.
Figure 6:
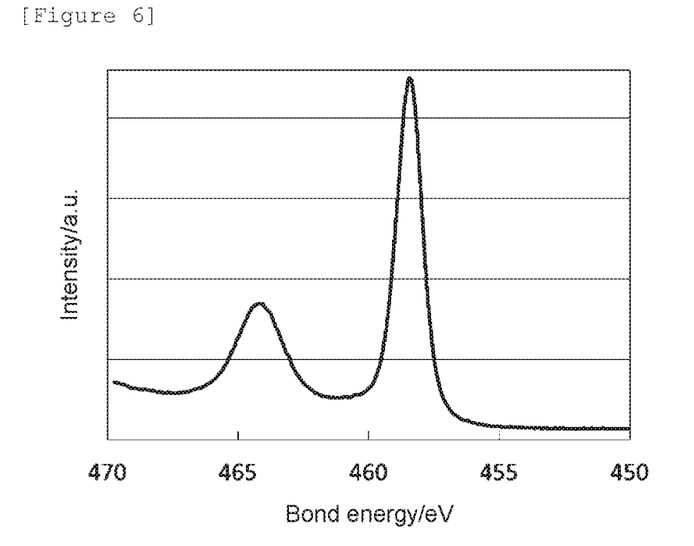
FIG. 6 shows a Ti2p XPS spectrum of the oxygen reduction catalyst (c1) of Comparative Example 1.

The obtained X-ray diffraction spectrum and Ti2p XPS spectrum are shown in FIG. 5 and FIG. 6, respectively. The oxygen reduction catalyst (c1) had an anatase content ratio of 100 mol %, and had the crystal structure of anatase titanium dioxide.

Also, the lattice constants a, b, and c of the oxygen reduction catalyst (c1) determined by a Rietveld analysis, the nitrogen element content (mass %) obtained by an elemental analysis, the signal intensity ratio N—Ti—N/O—Ti—N determined by an X-ray photoelectron spectroscopic analysis, the peak position determined as a bond energy at which the highest intensity was obtained in 458.0 to 459.5 eV, and the electrode potential and the spontaneous potential determined by an electrochemical measurement are shown in Table 1.

Comparative Example 2

(1) Preparation of Oxygen Reduction Catalyst

The oxygen reduction catalyst (c2) was obtained by performing temperature increase and calcination in the same manner as in Example 1 except that the end-point temperature at the temperature increase and the temperature for performing calcination were changed to 500° C.

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c2) were performed in the same manner as in Example 1.

Figure 7:
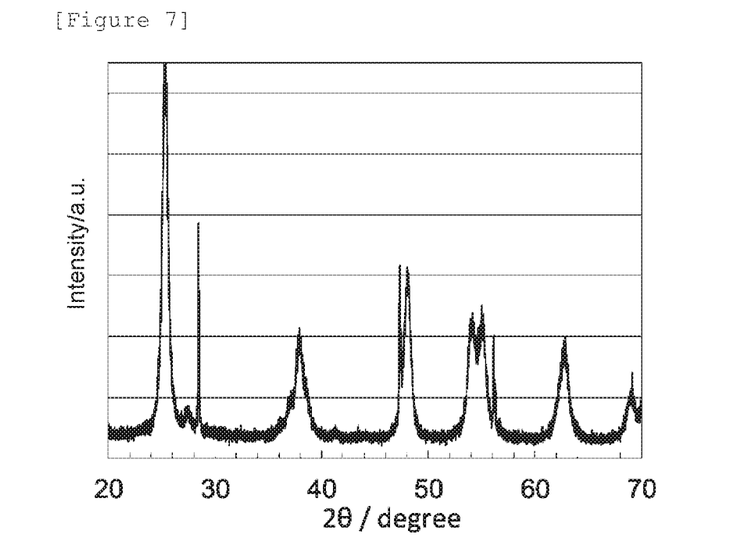
FIG. 7 shows an X-ray diffraction spectrum of the oxygen reduction catalyst (c2) of Comparative Example 2.
Figure 8:
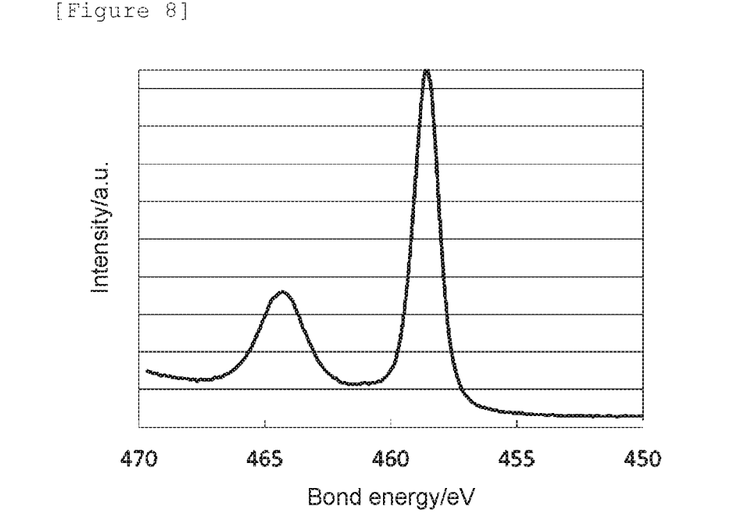
FIG. 8 shows a Ti2p XPS spectrum of the oxygen reduction catalyst (c2) of Comparative Example 2.

The obtained X-ray diffraction spectrum and Ti2p XPS spectrum are shown in FIG. 7 and FIG. 8, respectively. The oxygen reduction catalyst (c2) had an anatase content ratio of 100 mol %, and had the crystal structure of anatase titanium dioxide.

Also, the lattice constants a, b, and c of the oxygen reduction catalyst (c2) determined by a Rietveld analysis, the nitrogen element content (mass %) obtained by an elemental analysis, the signal intensity ratio N—Ti—N/O—Ti—N determined by an X-ray photoelectron spectroscopic analysis, the peak position determined as a bond energy at which the highest intensity was obtained in 458.0 to 459.5 eV, and the electrode potential and the spontaneous potential determined by an electrochemical measurement are shown in Table 1.

Comparative Example 3

(1) Preparation of Oxygen Reduction Catalyst

The oxygen reduction catalyst (c3) was obtained by performing temperature increase and calcination in the same manner as in Example 1 except that the stream of an ammonia gas was changed to a mixed stream of an ammonia gas and a nitrogen gas, and the flow rates of the ammonia gas and the nitrogen gas were changed to 20 mL/min and 180 mL/min (ammonia gas: 10 volt), respectively.

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c3) were performed in the same manner as in Example 1.

Figure 9:
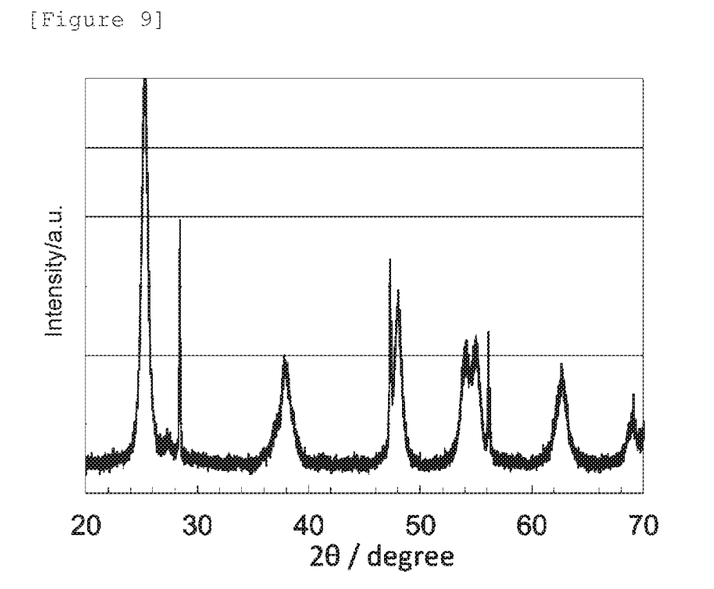
FIG. 9 shows an X-ray diffraction spectrum of the oxygen reduction catalyst (c3) of Comparative Example 3.
Figure 10:
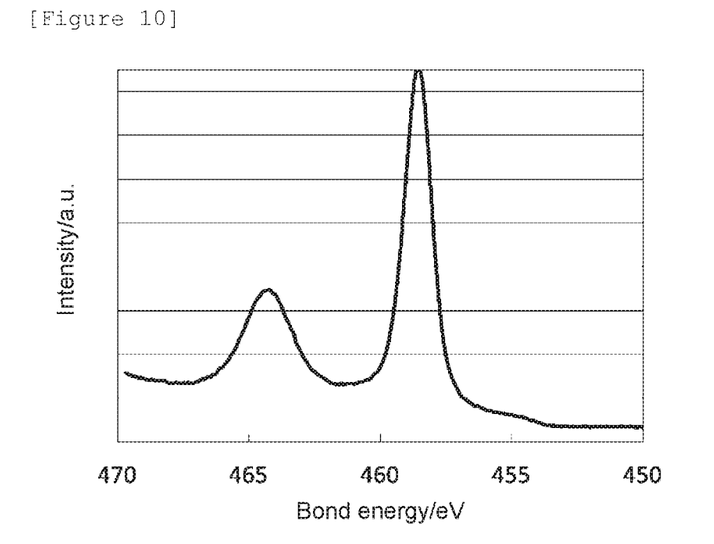
FIG. 10 shows a Ti2p XPS spectrum of the oxygen reduction catalyst (c3) of Comparative Example 3.

The obtained X-ray diffraction spectrum and Ti2p XPS spectrum are shown in FIG. 9 and FIG. 10, respectively. The oxygen reduction catalyst (c3) had an anatase content ratio of 100 mol %, and had the crystal structure of anatase titanium dioxide.

Also, the lattice constants a, b, and c of the oxygen reduction catalyst (c3) determined by a Rietveld analysis, the nitrogen element content (mass %) obtained by an elemental analysis, the signal intensity ratio N—Ti—N/O—Ti—N determined by an X-ray photoelectron spectroscopic analysis, the peak position determined as a bond energy at which the highest intensity was obtained in 458.0 to 459.5 eV, and the electrode potential and the spontaneous potential determined by an electrochemical measurement are shown in Table 1.

Comparative Example 4

(1) Preparation of Oxygen Reduction Catalyst

The oxygen reduction catalyst (c4) was obtained by performing temperature increase and calcination in the same manner as in Example 1 except that the stream of an ammonia gas was changed to a mixed stream of an ammonia gas and a nitrogen gas, and the flow rates of the ammonia gas and the nitrogen gas were both changed to 100 mL/min (ammonia gas: 50 vol %).

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c4) were performed in the same manner as in Example 1.

Figure 11:
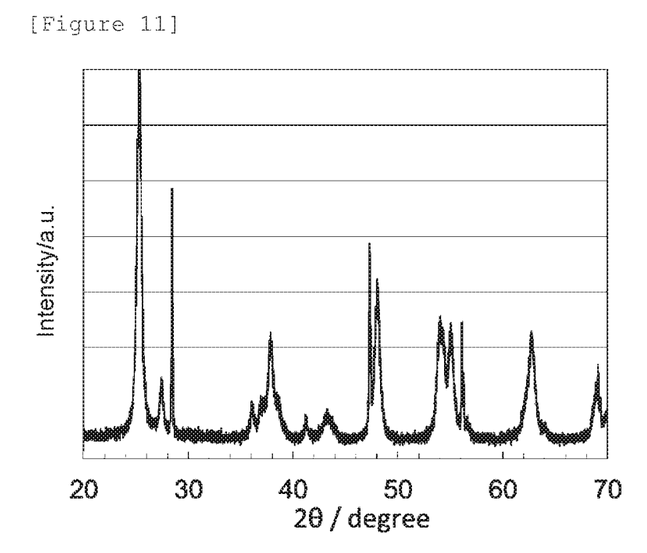
FIG. 11 shows an X-ray diffraction spectrum of the oxygen reduction catalyst (c4) of Comparative Example 4.
Figure 12:
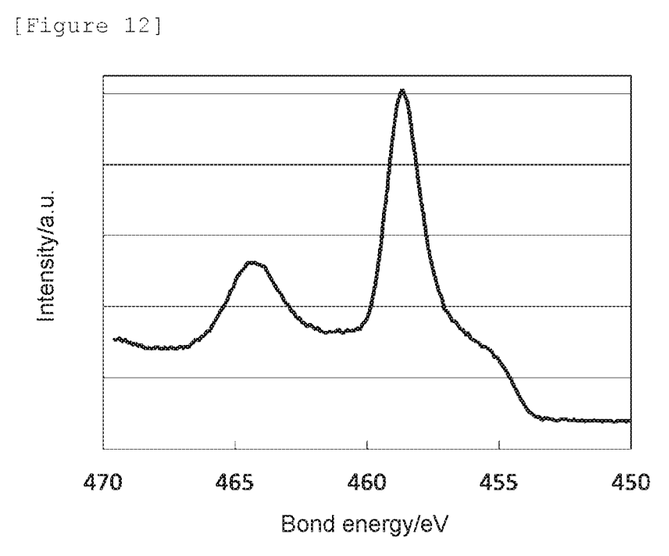
FIG. 12 shows a Ti2p XPS spectrum of the oxygen reduction catalyst (c4) of Comparative Example 4.

The obtained X-ray diffraction spectrum and Ti2p XPS spectrum are shown in FIG. 11 and FIG. 12, respectively. The oxygen reduction catalyst (c4) had an anatase content ratio of 92 mol %, wherein the rest was a cubic titanium nitride, and had crystal structure of anatase titanium dioxide.

Also, the lattice constants a, b, and c of the oxygen reduction catalyst (c4) determined by a Rietveld analysis, the nitrogen element content (mass %) obtained by an elemental analysis, the signal intensity ratio N—Ti—N/O—Ti—N determined by an X-ray photoelectron spectroscopic analysis and the peak position determined as a bond energy at which the highest intensity was obtained in 458.0 to 459.5 eV, and the electrode potential and the spontaneous potential determined by an electrochemical measurement are shown in Table 1.

Comparative Example 5

(1) Preparation of Oxygen Reduction Catalyst

The oxygen reduction catalyst (c5) was obtained by performing temperature increase and calcination in the same manner as in Example 1 except that the end-point temperature at the temperature increase and the temperature for performing calcination were changed to 800° C.

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c5) were performed in the same manner as in Example 1.

Figure 13:
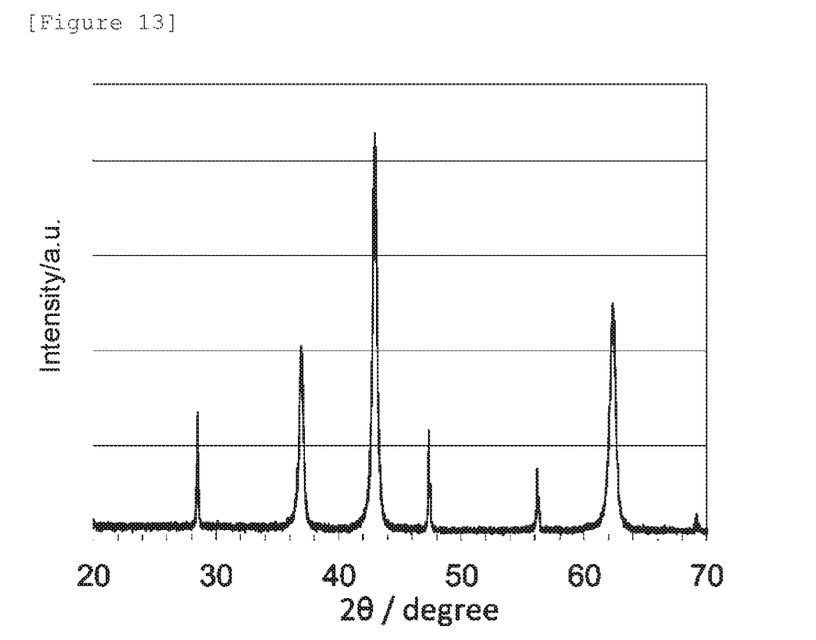
FIG. 13 shows an X-ray diffraction spectrum of the oxygen reduction catalyst (c5) of Comparative Example 5.
Figure 14:
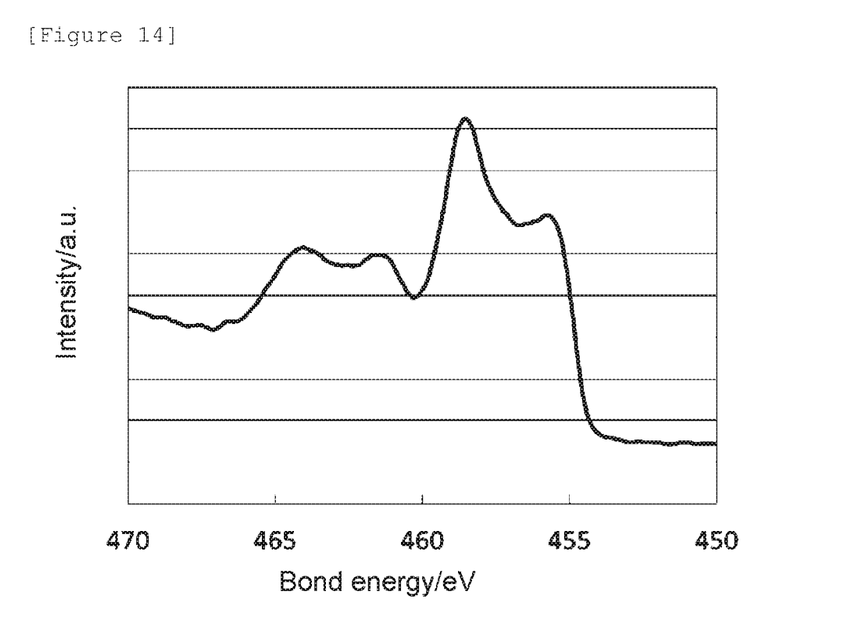
FIG. 14 shows a Ti2p XPS spectrum of the oxygen reduction catalyst (c5) of Comparative Example 5.

The obtained X-ray diffraction spectrum and Ti2p XPS spectrum are shown in FIG. 13 and FIG. 14, respectively. The oxygen reduction catalyst (c5) was entirely cubic titanium nitride, had an anatase content ratio of 0 mol %, and did not have the crystal structure of anatase titanium dioxide.

Also, the nitrogen element content (mass %) obtained by an elemental analysis of the oxygen reduction catalyst (c5), the signal intensity ratio N—Ti—N/O—Ti—N determined by an X-ray photoelectron spectroscopic analysis and the peak position determined as a bond energy at which the highest intensity was obtained in 458.0 to 459.5 eV, and the electrode potential and the spontaneous potential determined by an electrochemical measurement are shown in Table 1.

Comparative Example 6

(1) Preparation of Oxygen Reduction Catalyst

An anatase titanium dioxide powder (F-6, produced by Showa Denko K.K.) was used as it was without performing a heat treatment as an oxygen reduction catalyst (c6).

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c6) were performed in the same manner as in Example 1.

Figure 15:
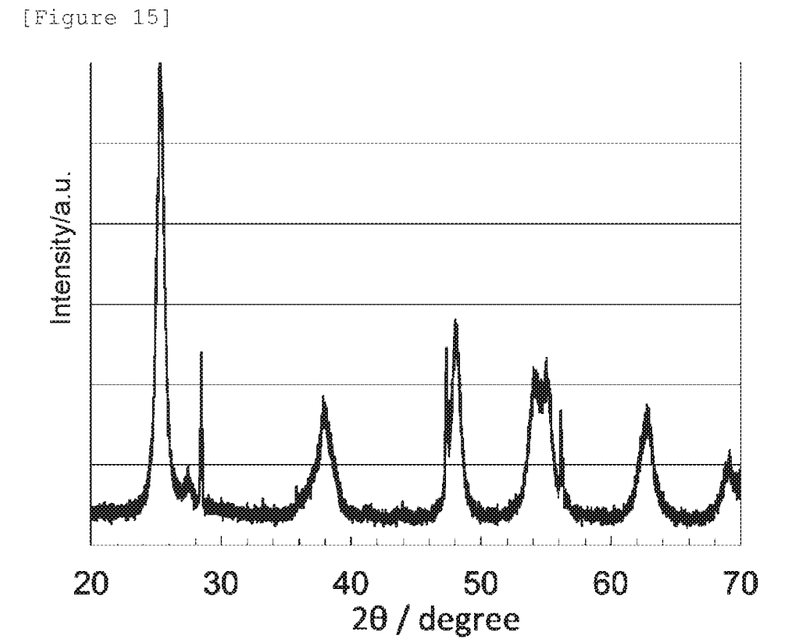
FIG. 15 shows an X-ray diffraction spectrum of the oxygen reduction catalyst (c6) of Comparative Example 6.
Figure 16:
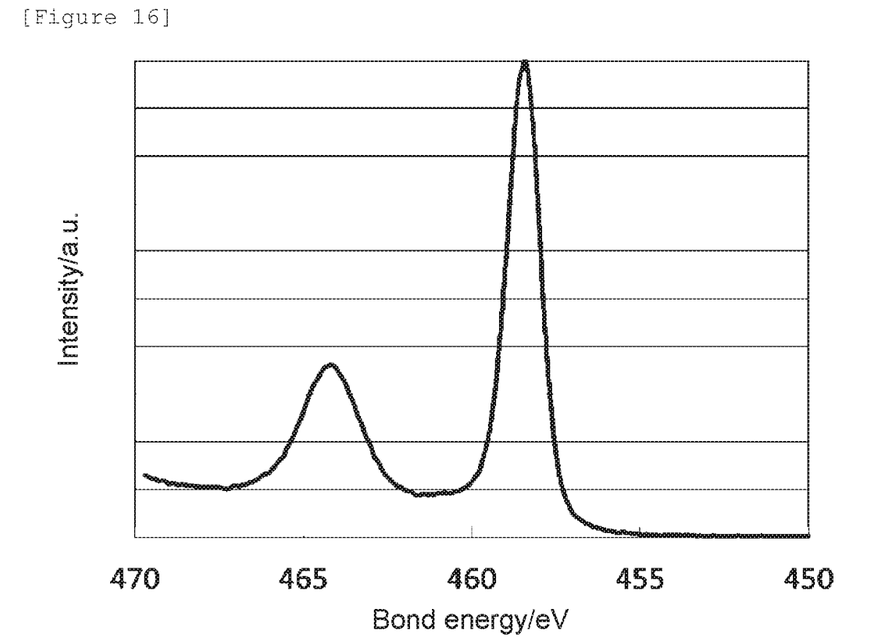
FIG. 16 shows a Ti2p XPS spectrum of the oxygen reduction catalyst (c6) of Comparative Example 6.

The obtained X-ray diffraction spectrum and Ti2p XPS spectrum are shown in FIG. 15 and FIG. 16, respectively.

Also, the lattice constants a, b, and c of the oxygen reduction catalyst (c6) determined by a Rietveld analysis, the nitrogen element content (mass %) obtained by an elemental analysis, the signal intensity ratio N—Ti—N/O—Ti—N determined by an X-ray photoelectron spectroscopic analysis, the peak position determined as a bond energy at which the highest intensity was obtained in 458.0 to 459.5 eV, and the electrode potential and the spontaneous potential determined by an electrochemical measurement are shown in Table 1.

Comparative Example 7

(1) Preparation of Oxygen Reduction Catalyst

The oxygen reduction catalyst (c7) was obtained by performing temperature increase and calcination in the same manner as in Example 1 except that the anatase titanium dioxide powder was changed to a brookite titanium dioxide powder (Nano Titania®, product name: NTB-200, produced by Showa Denko K.K.), the stream of an ammonia gas was changed to a mixed stream of an ammonia gas and a nitrogen gas, the flow rates of the ammonia gas and the nitrogen gas were both changed to 100 mL/min (ammonia gas: 50 vol %), and the end-point temperature at the temperature increase and the temperature for performing calcination were changed to 700° C.

(2) Electrochemical Measurement, Powder X-Ray Diffraction Measurement, Rietveld Analysis, X-Ray Photoelectron Spectroscopic Analysis, and Elemental Analysis The electrochemical measurement, powder X-ray diffraction measurement, Rietveld analysis, X-ray photoelectron spectroscopic analysis, and elemental analysis of the oxygen reduction catalyst (c7) were performed in the same manner as in Example 1.

Figure 17:
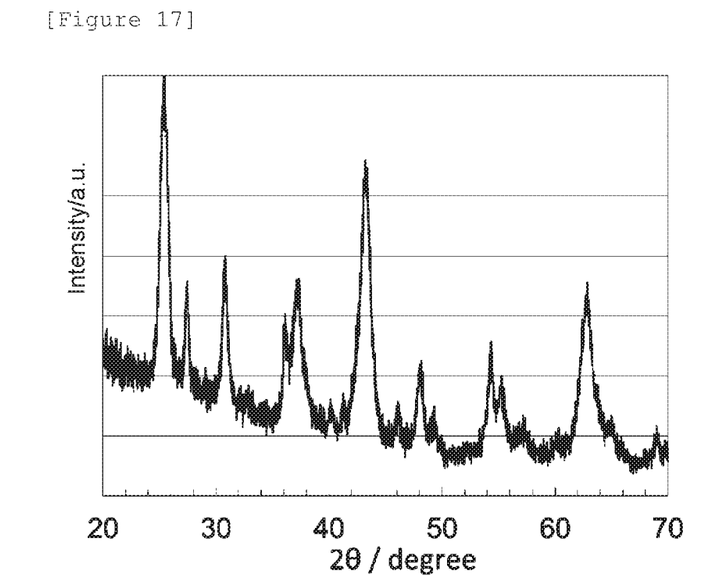
FIG. 17 shows an X-ray diffraction spectrum of the oxygen reduction catalyst (c7) of Comparative Example 7.
Figure 18:
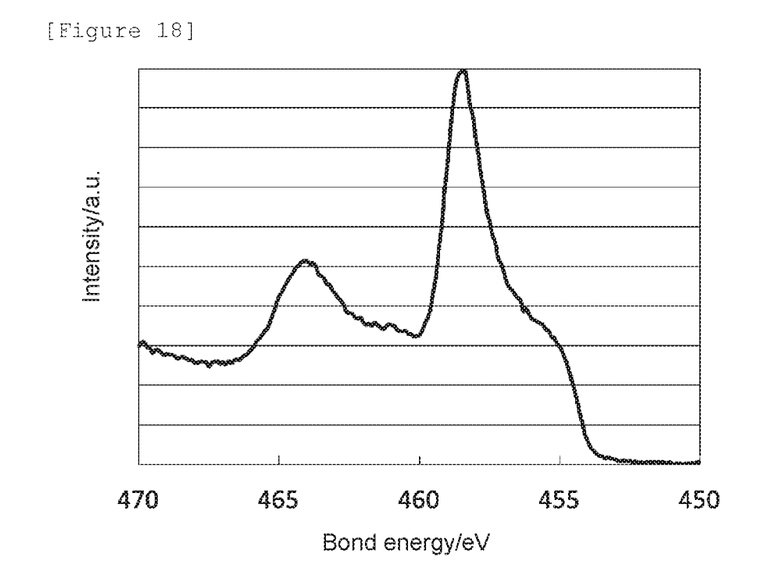
FIG. 18 shows a Ti2p XPS spectrum of the oxygen reduction catalyst (c7) of Comparative Example 7.

The obtained X-ray diffraction spectrum and Ti2p XPS spectrum are shown in FIG. 17 and FIG. 18, respectively. The oxygen reduction catalyst (c7) had an anatase content ratio of 4 mol %, wherein the rest was a brookite titanium dioxide, and did not have the crystal structure of anatase titanium dioxide.

Also, the nitrogen element content (mass %) obtained by an elemental analysis of the oxygen reduction catalyst (c7), the signal intensity ratio N—Ti—N/O—Ti—N determined by an X-ray photoelectron spectroscopic analysis, the peak position determined as a bond energy at which the highest intensity was obtained in 458.0 to 459.5 eV, and the electrode potential and the spontaneous potential determined by an electrochemical measurement are shown in Table 1.

TABLE 1

| | Catalyst name | Nitrogen element content (mass %) | Existence of anatase titanium dioxide | Lattice constants of anatase titanium dioxide (Å) | | | Signal intensity ratio N—Ti—N/O—Ti—N | Peak position located in range of 458.0 to 459.5 eV (eV) | Electrode potential at 10 μA (V) | Spontaneous potential in oxygen gas atmosphere (V) |
|---|---|---|---|---|---|---|---|---|---|---|
| | | | | a \|a1 − a0\| | b \|b1 − b0\| | c \|c1 − c0\| | | | | |
| Example 1 | Oxygen reduction catalyst (1) | 10 | Yes | 3.786 0.000 | 3.786 0.000 | 9.496 0.001 | 0.36 | 458.8 | 0.474 | 0.652 |
| Example 2 | Oxygen reduction catalyst (2) | 13 | Yes | 3.788 0.002 | 3.788 0.002 | 9.497 0.002 | 0.64 | 458.5 | 0.453 | 0.631 |
| Comparative Example 1 | Oxygen reduction catalyst (c1) | 1.6 | Yes | 3.787 0.001 | 3.787 0.001 | 9.495 0.000 | 0.01 | 458.4 | 0.379 | 0.569 |
| Comparative Example 2 | Oxygen reduction catalyst (c2) | 1.9 | Yes | 3.786 0.000 | 3.786 0.000 | 9.495 0.000 | 0.01 | 458.6 | 0.376 | 0.567 |
| Comparative Example 3 | Oxygen reduction catalyst (c3) | 2.6 | Yes | 3.788 0.002 | 3.788 0.002 | 9.496 0.001 | 0.05 | 458.6 | 0.372 | 0.563 |
| Comparative Example 4 | Oxygen reduction catalyst (c4) | 7.1 | Yes | 3.786 0.000 | 3.786 0.000 | 9.493 0.002 | 0.26 | 458.7 | 0.406 | 0.552 |
| Comparative Example 5 | Oxygen reduction catalyst (c5) | 20 | No | — | — | — | 0.70 | 458.5 | 0.395 | 0.558 |
| Comparative Example 6 | Oxygen reduction catalyst (c6) | 0 | Yes | 3.786 0.000 | 3.786 0.000 | 9.492 0.003 | 0.01 | 459.0 | 0.369 | 0.585 |
| Comparative Example 7 | Oxygen reduction catalyst (c7) | 9 | No | — | — | — | 0.35 | 458.4 | 0.399 | 0.562 |

The invention claimed is:

1. An oxygen reduction catalyst being a titanium oxynitride that has a nitrogen element content of 8.0 to 15 mass %, has a crystal structure of anatase titanium dioxide in a powder X-ray diffraction measurement, and has a signal intensity ratio N—Ti—N/O—Ti—N in an X-ray photoelectron spectroscopic analysis of in the range of 0.35 to 0.70.

2. The oxygen reduction catalyst according to claim 1, wherein each of |a1−a0|, |b1−b0|, and |c1−c0| is 0.005 Å or less, when a1, b1, and c1 represent lattice constants a, b, and c, respectively, of the crystal structure of the titanium oxynitride, and a0, b0, and c0 represent lattice constants a, b, and c, respectively, of the crystal structure of anatase titanium dioxide consisting solely of titanium and oxygen.

3. An electrode catalyst for a fuel cell, composed of the oxygen reduction catalyst according to claim 1.

4. A fuel cell electrode comprising a catalyst layer comprising the electrode catalyst for a fuel cell according to claim 3.

5. A membrane electrode assembly comprising a cathode, an anode, and a polymer electrolyte membrane placed between the cathode and the anode, wherein at least either of the cathode and the anode is the fuel cell electrode according to claim 4.

6. A fuel cell comprising the membrane electrode assembly according to claim 5.

* * * * *